UNITED STATES PATENT OFFICE.

RAMON BONASTRE LLOPART, OF CORDOBA, ARGENTINA.

INALTERABLE WHITE PIGMENT AND PROCESS OF MAKING SAME.

1,139,427.

Specification of Letters Patent.　Patented May 11, 1915.

No Drawing.　Application filed February 19, 1915.　Serial No. 9,300.

*To all whom it may concern:*

Be it known that I, RAMON BONASTRE LLOPART, subject of the King of Spain, residing at Cordoba, Province of Cordoba, Argentina, have invented a new and useful Improvement in Inalterable White Pigments and Processes of Making Same; and I do hereby declare the following to be a full, clear, and exact description of the same.

This invention relates to an inalterable white product of the lithopone series, for painting and other purposes, formed on a base of zinc sulfid and barium sulfate.

By combining water solutions of zinc sulfate and barium sulfid, an equimolecular precipitate of zinc sulfid and barium sulfate is obtained. When by means of known processes sulfid of zinc is extracted either alone or combined with salts of barium, calcium, strontium and the like, an industrial product similar to the above precipitate is obtained. These products are generally used in connection with the manufacture of rubber goods, celluloid, wax cloth, the like, and painting. When employed for painting, particularly when mixed with dye-stuffs or pigments from other salts, and diluted with raw or boiled oil or varnish, they are subject to darkening change of color or phosphorescences, especially if mixed with varnish, boiled oil or pigments of salts of metals other than zinc. This darkening, change of color, or phosphorescences are caused by the presence of other metals such as manganese, bismuth, cobalt, iron, copper, antimony, nickel and the like, and give rise to a kind of efflorescence with the result that the paint falls off sooner or later after having been applied. These disadvantages have prevented an advantageous or rational employment of paints of the above mentioned bases on places exposed to sun-light or less powerful light, and on places subject to varying atmospheric conditions.

The object of the present invention is to overcome these disadvantages and to provide a stable white product absolutely inalterable under the influence of light and atmospheric and other conditions, and while keeping all of these properties is adapted to be mixed with any color pigment, varnish or raw or boiled oil of the kind usually used for painting. This inalterable white product consists of equi-moleculars precipitates of zinc sulfid and barium sulfate subsequently treated as hereindescribed and precipitated by the reaction upon each other of zinc sulfate and barium sulfid, as will be explained.

Further objects are to provide a simple and efficient process comprising novel steps for manufacturing this process.

The new process is in substance as follows:—

Zinc blende, or zinc blende and other substances is roasted in such a manner that zinc sulfate and other substances are produced. This mixture is agitated in water preferably hot, and the resulting water solution of zinc sulfate is decanted and then submitted to the action of oxygen from the air and bioxids under the influence of heat. This is accomplished by mixing the zinc sulfate solution with bioxid (*e. g.* barium dioxid or lead dioxid) and water heated by steam to about 100° C. at the same time passing bubbles of air therethrough. The resultant is a pure stable sulfate of zinc in water solution, which is then passed through a filter press to free it of foreign matter.

The barium sulfid is obtained from the ores by known processes and a water solution thereof prepared by stirring in hot water. The water solution of zinc sulfate and barium sulfid are mixed in a large tank and react upon each other and produce a precipitate containing barium sulfate and entirely pure stable zinc sulfid. This precipitate is pressed in a filter press and then dried. The dried product is then calcined in a hermetically closed muffle of known construction provided with a water seal or other form of seal to permit the escape of the vapors driven off, at the same time preventing the ingress of air. This calcining is carried on at a temperature of about 500 to 700° C. and drives off the water of composition but does not decompose the substances as in known process wherein air is admitted or a high temperature used. After calcining the lithopone product is immediately cooled off by immersing in cold water, changing the water until the product is entirely cooled, reducing the calcined product to paste form after which it is ground, washed in water, heated to about 80° to 100° C., again pressed in a filter press, and afterward rapidly dried at a heat less than 100° C. which reduces the lithopone to a more or less powder form after which it is finished by passing it through the usual disintegrator. If instead of the powder, the paste form is desired after washing and heating to 80° to 100° C. and pressing in the filter press as above described, the pressed product is passed through the usual emulsifier which presses out the water and substitutes oil. The emulsion is then ground by passing between cylinders as is well known.

This product is entirely neutral and stable and is permanently white and does not combine with substances producing discoloration or decomposition or efflorescence. This product, either alone or mixed with other ingredients, such as lead, anilin, etc., or mixed with raw or boiled oil or with varnish, or any material usually used in painting, will not, when submitted to action of the atmosphere or light, show any alteration of color nor decompose to any extent.

I claim as my invention:—

1. The hereindescribed process of preparing an inalterable white product, said process consisting in treating a pure stable sulfate of zinc solution with a water solution of barium sulfid whereby a lithopone product containing pure stable sulfid of zinc is precipitated; drying the product and calcining it out of contact with air at about 500° to 700° C.; suddenly cooling the calcined product; washing the cooled product; heating to 80° to 100° C.; and preparing the product for use.

2. The herein described process of preparing an inalterable white product, said process consisting in treating a pure stable sulfate of zinc water solution with a water solution of barium sulfid whereby a lithopone product containing pure stable sulfid of zinc is precipitated; drying the product and calcining it at below red heat out of contact with air; and preparing the calcined product for use.

3. A step in the process of manufacturing lithopone, said step consisting in precipitating lithopone, calcining it out of contact with air at 500° to 700° C.; and preparing the calcined product for use.

4. A step in the process of manufacturing lithopone, said step consisting in precipitating lithopone; drying the product and calcining it out of contact with air at about 500° to 700° C.; suddenly cooling the calcined product; washing the cooled product; heating to 80° to 100° C.; and preparing the product for use.

5. A step in the process of manufacturing lithopone, said step consisting in precipitating the lithopone; drying and calcining the lithopone; immediately cooling the calcined lithopone by immersing in water and changing the water until the lithopone is cold; grinding; washing in water; heating to about 80° to 100° C.; pressing; and rapidly drying at a heat less than 100° C.

6. The herein described process of preparing lithopone, said process consisting in precipitating lithopone from water solutions of barium sulfid and zinc sulfate; drying the precipitate; calcining it; cooling the calcined product; washing it; and drying at a temperature not greater than 100° C.

7. The herein described process of preparing lithopone, said process consisting in drying and calcining precipitated lithopone; cooling and washing the calcined product; and drying the cooled and washed product at 80° to 100° C.

8. The herein described process of preparing lithopone, said process consisting in drying and calcining precipitated lithopone, cooling and washing the calcined product, and drying the cooled and washed product at a temperature less than 100° C.

9. The herein described process of preparing lithopone, said process consisting in drying and calcining precipitated lithopone, cooling and washing the calcined product; drying the cooled and washed product at a temperature less than 100° C. and disintegrating the dried product.

10. An industrial product for painting purposes consisting of lithopone composed of barium sulfate and inalterable stable sulfid of zinc calcined at a temperature less than 700° C.

11. An industrial product for painting purposes comprising stable sulfid of zinc calcined at a temperature not greater than 700° C.

12. A step in the process of manufacturing lithopone, said step consisting in precipitating, drying and calcining the lithopone; and quickly cooling the lithopone by immediately immersing in water and repeatedly changing the water until the lithopone is cold.

In testimony whereof, I have signed my name to this specification in the presence of two subscribing witnesses.

RAMON BONASTRE LLOPART.

Witnesses:
H. van Oldenneel,
H. M. Kilpatrick.